United States Patent
Masumoto et al.

(10) Patent No.: US 7,430,054 B2
(45) Date of Patent: Sep. 30, 2008

(54) PRINTING APPARATUS, CONTROL METHOD THEREFOR, AND STORAGE MEDIUM

(75) Inventors: Kazuyuki Masumoto, Kanagawa (JP); Hiromitsu Hirabayashi, Kanagawa (JP); Masashi Kamada, Kanagawa (JP); Kentaro Yano, Kanagawa (JP); Akitoshi Yamada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 633 days.

(21) Appl. No.: 10/785,012

(22) Filed: Feb. 25, 2004

(65) Prior Publication Data
US 2004/0196484 A1 Oct. 7, 2004

Related U.S. Application Data

(63) Continuation of application No. PCT/JP02/10878, filed on Oct. 21, 2002.

(30) Foreign Application Priority Data
Oct. 22, 2001 (JP) ............... 2001-324054

(51) Int. Cl.
G06K 15/00 (2006.01)
G06F 15/00 (2006.01)
(52) U.S. Cl. .................... 358/1.14; 358/1.15
(58) Field of Classification Search ............. 358/1.1, 358/1.9, 1.13, 1.15, 448, 402
See application file for complete search history.

(56) References Cited

U.S. PATENT DOCUMENTS

| | | | |
|---|---|---|---|
| 5,293,481 A | 3/1994 | Mita et al. | 395/163 |
| 5,422,738 A | 6/1995 | Ishihara et al. | 358/500 |
| 6,052,207 A | 4/2000 | Takagi et al. | 358/452 |
| 6,058,465 A | 5/2000 | Nguyen | 712/7 |
| 6,178,004 B1 | 1/2001 | Ochiai | 358/1.14 |
| 6,351,314 B1 | 2/2002 | Nakagiri | 358/1.11 |
| 6,354,752 B1 | 3/2002 | Nakagiri | 400/76 |
| 6,493,472 B1 | 12/2002 | Takagi et al. | 382/317 |
| 6,507,358 B1 | 1/2003 | Mori et al. | 348/42 |
| 6,552,743 B1 | 4/2003 | Rissman | 348/207.2 |
| 6,563,596 B1 | 5/2003 | Narushima | 358/1.14 |
| 6,570,664 B2 | 5/2003 | Nakagiri | 358/1.11 |

(Continued)

FOREIGN PATENT DOCUMENTS

CN 1137649 12/1996

(Continued)

OTHER PUBLICATIONS

European Search Report dated Apr. 28, 2004 (Ref. No. P202-0293EP/02022448.1-1241-).

(Continued)

Primary Examiner—Gabriel I. Garcia
(74) Attorney, Agent, or Firm—Fitzpatrick, Cella, Harper & Scinto

(57) ABSTRACT

A photo-direct printer apparatus which prints an image on the basis of image data from a digital camera, memory card, or PC serving as an image data source receives a control command from the image data source, interprets the control command, and receives image data from the image data source on the basis of the command. The printer apparatus decodes and processes the received image data, and generates and prints print data and print an image based on the print data.

10 Claims, 18 Drawing Sheets

U.S. PATENT DOCUMENTS

| | | | |
|---|---|---|---|
| 6,753,903 B1 | 6/2004 | Lin | 348/207.2 |
| 6,831,755 B1 | 12/2004 | Narushima et al. | 358/1.9 |
| 6,882,440 B1 | 4/2005 | Nitta | 358/1.16 |
| 7,202,975 B2 * | 4/2007 | Narushima et al. | 358/1.9 |
| 2003/0174351 A1 | 9/2003 | Kawanabe et al. | 358/1.9 |

FOREIGN PATENT DOCUMENTS

| | | |
|---|---|---|
| CN | 1152747 | 6/1997 |
| EP | 0 859 327 | 8/1998 |
| EP | 0 860 980 | 8/1998 |
| EP | 0938041 | 8/1999 |
| EP | 0 949 804 | 10/1999 |
| EP | 1 087 607 | 3/2001 |
| EP | 1 119 177 | 7/2001 |
| JP | 60-146574 | 8/1985 |
| JP | 05-318845 | 12/1993 |
| JP | 2000-052605 | 2/2000 |
| JP | 2000-177210 | 6/2000 |
| JP | 2001-177210 | 6/2000 |
| JP | 2000-198240 | 7/2000 |
| JP | 2001-088374 | 4/2001 |
| JP | 2001-282470 | 10/2001 |
| JP | 2001-290615 | 10/2001 |

OTHER PUBLICATIONS

Chinese Official Action dated Mar. 19, 2004 (Appln. No. 02143801.3).

* cited by examiner

PRINTING APPARATUS, CONTROL METHOD THEREFOR, AND STORAGE MEDIUM

CROSS REFERENCE TO RELATED APPLICATION

This application is a continuation of International Application No. PCT/JP02/10878 filed Oct. 21, 2002, and published in English as WO 03/035404 A1 on May 1, 2003.

TECHNICAL FIELD

The present invention relates to a printing apparatus which receives image data from an image sensing apparatus such as a digital camera, a memory, or the like and prints the image data on a print medium, a control method therefore, and a storage medium.

BACKGROUND ART

In recent years, digital cameras (image sensing apparatuses) capable of photographing an image by a simple operation and converting the image into digital image data have widely been used. To print an image photographed by this camera and use the print as a photograph, the photographed digital image data is temporarily input from the digital camera to a PC (computer), and undergoes image processing by the PC. Then, the processed data is output from the PC to a color printer, which prints the data.

To the contrary, there have been developed color print systems capable of directly transferring digital image data from a digital camera to a color printer and printing the data without the mediacy of any PC, and so-called photo-direct (PD) printers capable of directly mounting in a color printer a memory card which is mounted in a digital camera and stores a sensed image, and printing the photographed image stored in the memory card.

Image data input to this photo-direct (PD) printer are data of various data formats including JPG data, BMP data, HTML data, and RGB data such as a television signal. As an interface for inputting such image data, various interfaces such as USB, IEEE 1394, and Bluetooth have been used. Under this circumstance, the demand has arisen for the advent of a photo-direct (PD) printer applicable to any interface or data format.

DISCLOSURE OF INVENTION

The present invention has been made in consideration of the above situation, and has as its object to provide a printing apparatus capable of executing processing of image data in accordance with a control command transmitted from an image data source and printing the image data, a control method therefor, and a storage medium.

It is another object of the present invention to provide a printing apparatus capable of receiving image data from a plurality of image data sources and printing the image data, a control method therefor, and a storage medium.

The feature of a printing apparatus of the present invention is as follows:

A printing apparatus for printing an image on the basis of image data from an image data source, comprises printing means for printing an image on a print medium on the basis of print data; command determination means for interpreting a control command from the image data source and determining a content designated by the control command; image processing means for processing image data from the image data source on the basis of a determination result by the command determination means; and print control means for generating print data on the basis of the image data processed by the image processing means, outputting the print data to the printing means, and printing the print data.

Other features and advantages of the present invention will be apparent from the following descriptions taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the descriptions, serve to explain the principle of the invention.

BEST MODE FOR CARRYING OUT THE INVENTION

Preferred embodiments of the present invention will be described in detail below with reference to the accompanying drawings.

Figure 1:
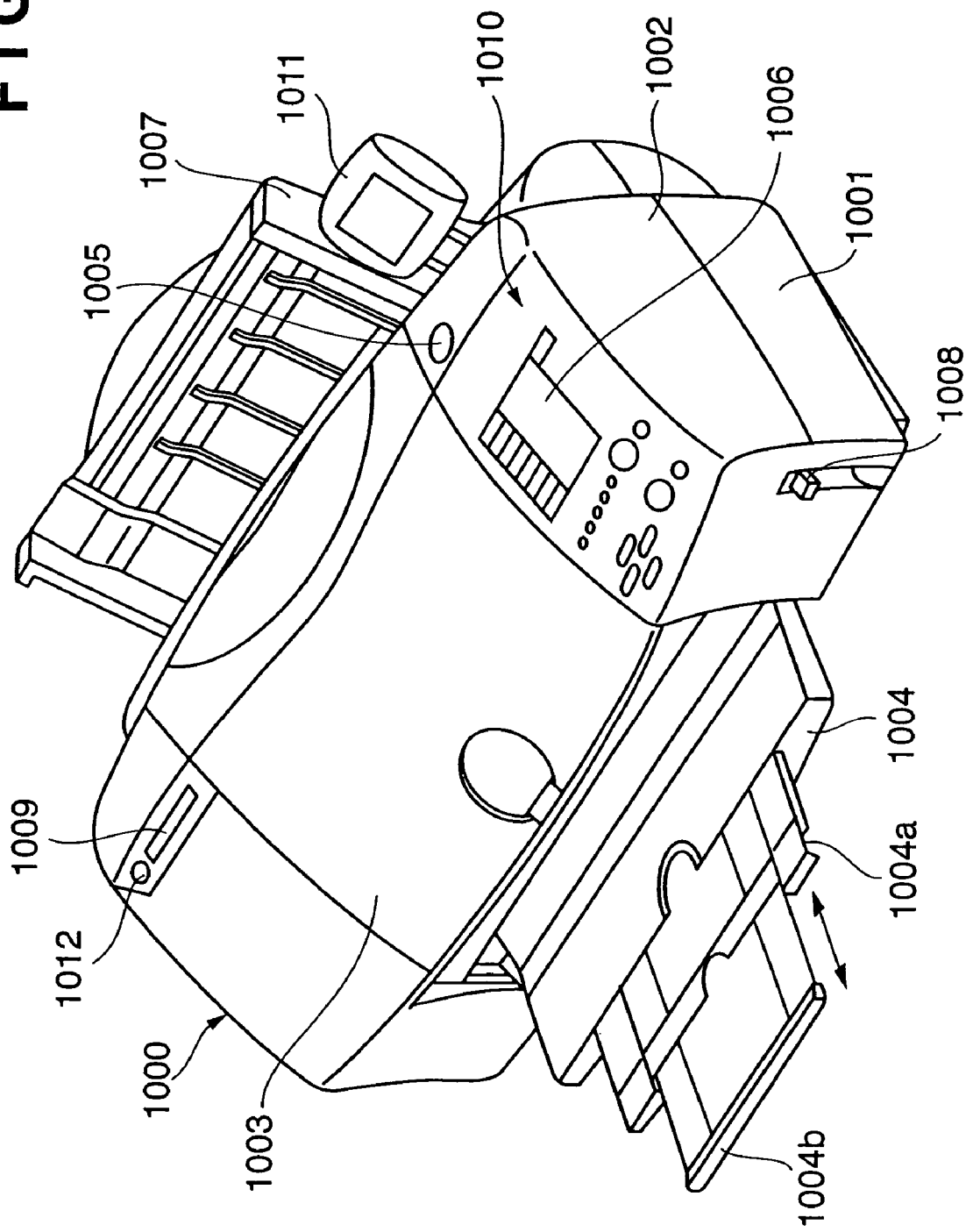
FIG. 1 is a schematic perspective view showing a photo-direct printer apparatus according to an embodiment of the present invention.

FIG. 1 is a schematic perspective view showing a photo-direct printer 1000 according to an embodiment of the present invention. The photo-direct printer has a general PC printer function of receiving data from a host computer (PC) and printing the data, a function of directly reading and printing image data stored in a storage medium such as a memory card, and a function of receiving image data from a digital camera and printing the data.

In FIG. 1, the main body which defines the casing of the photo-direct printer 1000 according to the embodiment has casing members: a lower case 1001, upper case 1002, access cover 1003, and discharge tray 1004. The lower case 1001 forms almost the lower half of the printer 1000, whereas the upper case 1002 forms almost the upper half of the main body. A combination of these cases forms a hollow structure with a storage space where each mechanism (to be described later) is stored. The upper and front surfaces have openings. The discharge tray 1004 is rotatably held at one end by the lower case 1001, and the opening in the front surface of the lower case 1001 is opened/closed by rotating the discharge tray 1004. To execute print operation, the discharge tray 1004 is rotated toward the front side to open the opening. Print sheets can be discharged from the opening, and the discharged print sheets can be sequentially stacked. The discharge tray 1004 houses two auxiliary trays 1004a and 1004b. These trays are pulled out to enlarge/reduce the paper support area in three stages, as needed.

The access cover 1003 is rotatably held at one end by the upper case 1002 so as to open/close the opening formed in the upper surface. Opening the access cover 1003 enables exchanging a print head cartridge (not shown), ink tank (not shown), or the like stored in the main body. Although not shown, a projection formed on the back surface of the access cover 1003 rotates a cover opening/closing lever when the access cover 1003 is opened/closed. The lever rotation position is detected by a microswitch or the like, thereby detecting the open/closed state of the access cover 1003.

A power key 1005 is attached to the upper surface of the upper case 1002. An operation panel 1010 having a liquid crystal display 1006, various key switches, and the like is arranged on the right side of the upper case 1002. The structure of the operation panel 1010 will be described in detail with reference to FIG. 3. Reference numeral 1007 denotes an automatic feeder which automatically feeds print sheets into the apparatus main body; 1008, a paper interval selection lever for adjusting the interval between the print head and the print sheet; and 1009, a card slot into which an adapter capable of mounting a memory card is inserted. Image data stored in a memory card can be directly received and printed via the adapter. The memory card (PC) includes, e.g., a compact flash memory, smart media, and memory stick. Reference numeral 1011 denotes a viewer (liquid crystal display) which is detachable from the apparatus main body and is used to display an image of one frame, an index image, and the like when images stored in the PC card are searched for an image to be printed; and 1012, a USB terminal for connecting a digital camera (to be described later). A USB bus connector for connecting a personal computer (PC) is attached to the back side (not shown) of the apparatus main body.

Figure 2:
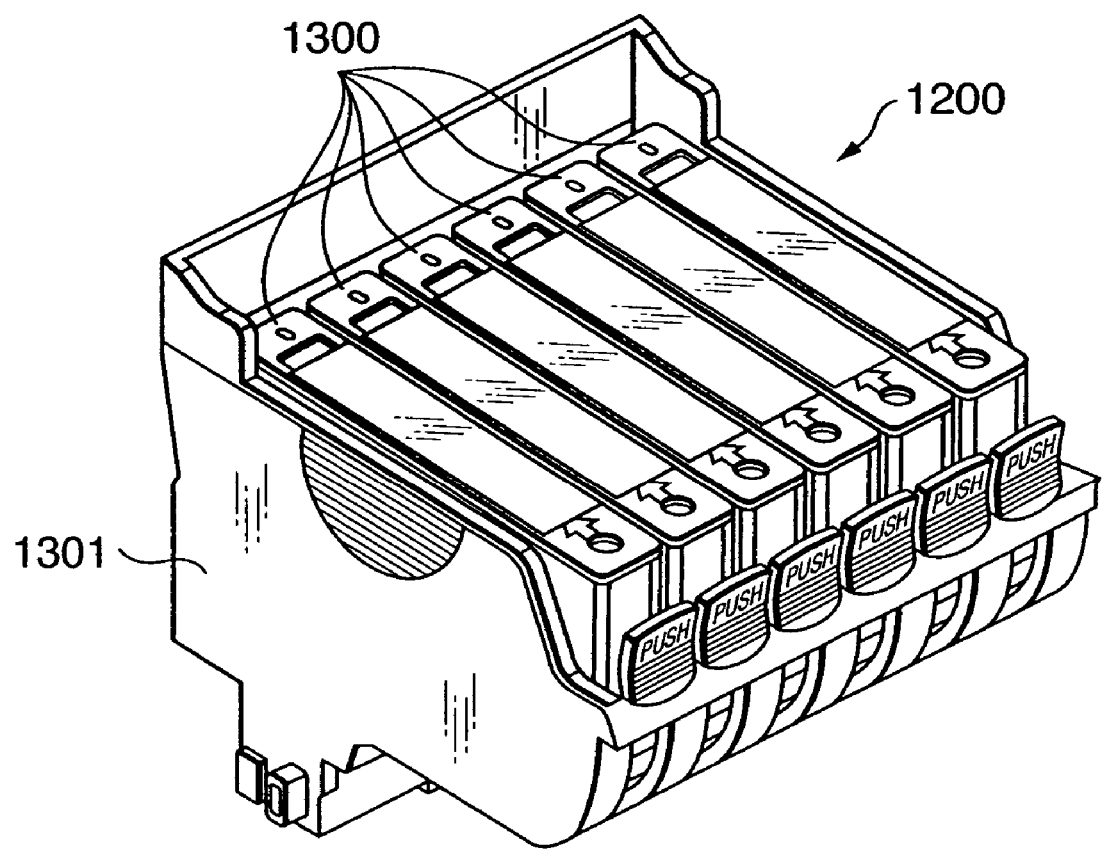
FIG. 2 is a schematic perspective view showing the print head of the photo-direct printer apparatus according to the embodiment of the present invention.

FIG. 2 is a schematic perspective view showing the structure of the print head of the photo-direct printer 1000 according to the embodiment.

As shown in FIG. 2, a print head cartridge 1200 in this embodiment comprises ink tanks 1300 which store inks, and a print head 1301 which discharges inks supplied from the ink tanks 1300 from nozzles in accordance with print information. The print head 1301 is a so-called cartridge which is detachably mounted on a carriage 1102. In printing, the print head cartridge 1200 is reciprocally moved along the carriage axis, and a color image is printed on a print sheet along with the movement. To realize photographic high-quality color printing, independent ink tanks of, e.g., black, light cyan (LC), light magenta (LM), cyan, magenta, and yellow are prepared as ink tanks for the print head cartridge 1301. Each ink tank is freely detachable from the print head 1301.

The embodiment will exemplify the use of the above-mentioned six color inks, but the present invention is not limited to the use of these six color inks and can also be applied to an ink-jet printer which prints using inks of four colors: black, cyan, magenta, and yellow. In this case, independent ink tanks of the four colors may be freely detachable from the print head 1301.

Figure 3:
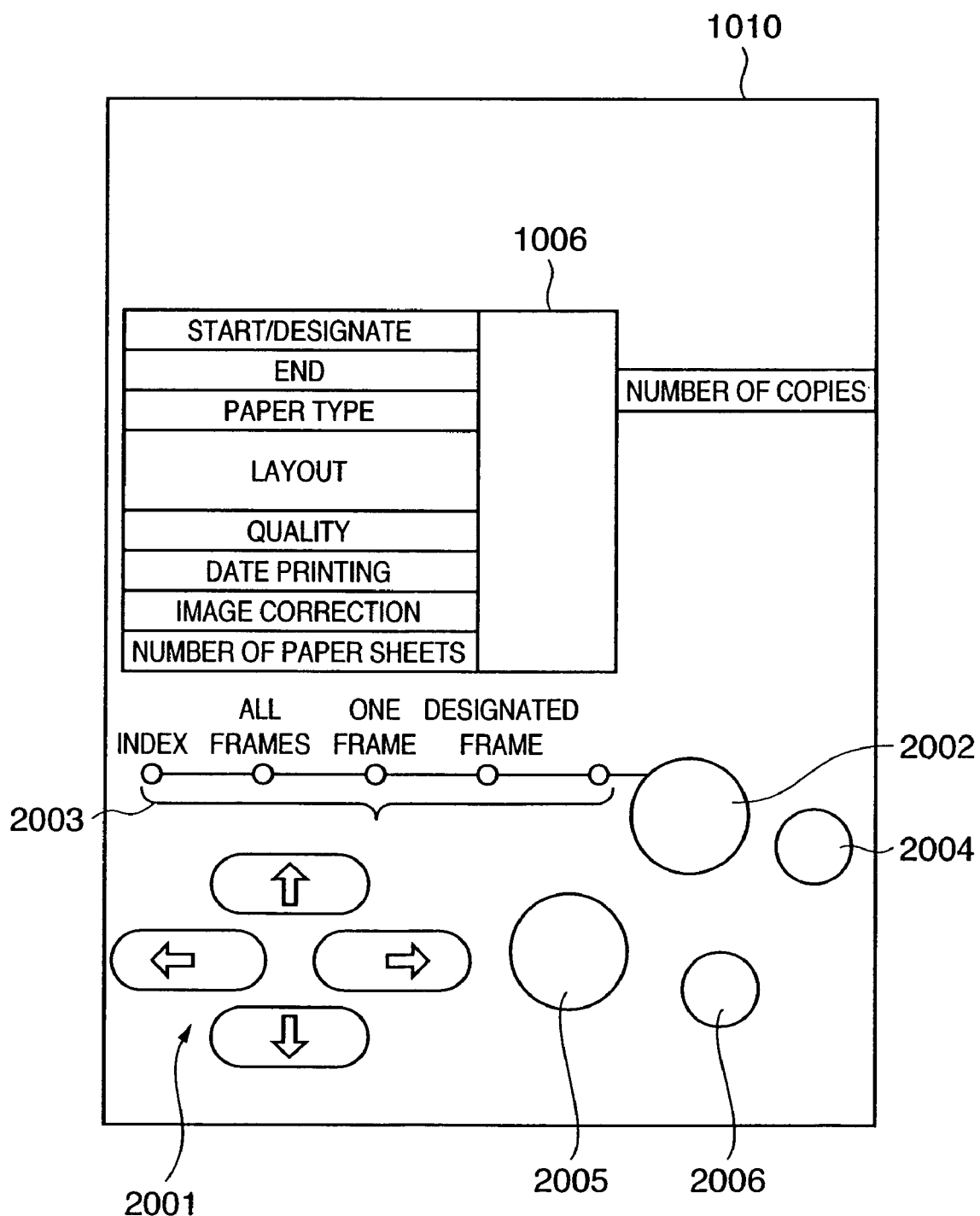
FIG. 3 is a schematic view showing the operation panel of the photo-direct printer apparatus according to the embodiment.

FIG. 3 is a schematic view showing the operation panel 1010 according to the embodiment.

In FIG. 3, the liquid crystal display 1006 displays menu items for various settings of data on items printed on the right and left of the display 1006. The displayed items are the first photograph number subjected to printing, a designated frame number (start/-designate), the last photograph number subjected to printing (end), the number of prints (number of copies), the type of paper (print sheet) used for printing (paper type), setting of the number of photographs to be printed on one paper sheet (layout), designation of the print quality (quality), designation whether to print a photographing date (date printing), designation whether to correct and print an image (image correction), and display of the number of paper sheets necessary for printing (number of paper sheets). These items are selected or designated with cursor keys 2001. Reference numeral 2002 denotes a mode key which allows switching the type of printing (index printing, printing of all frames, printing of one frame, printing of a designated frame, or the like) every time the key 2002 is pressed. A corresponding one of LEDs 2003 is turned on accordingly. Reference numeral 2004 denotes a maintenance key for performing printer maintenance such as cleaning of the print head 1301; 2005, a print start key which is pressed to designate the start of printing or establish maintenance setting; and 2006, a print stop key which is pressed to stop printing or designate to stop maintenance.

Figure 4:
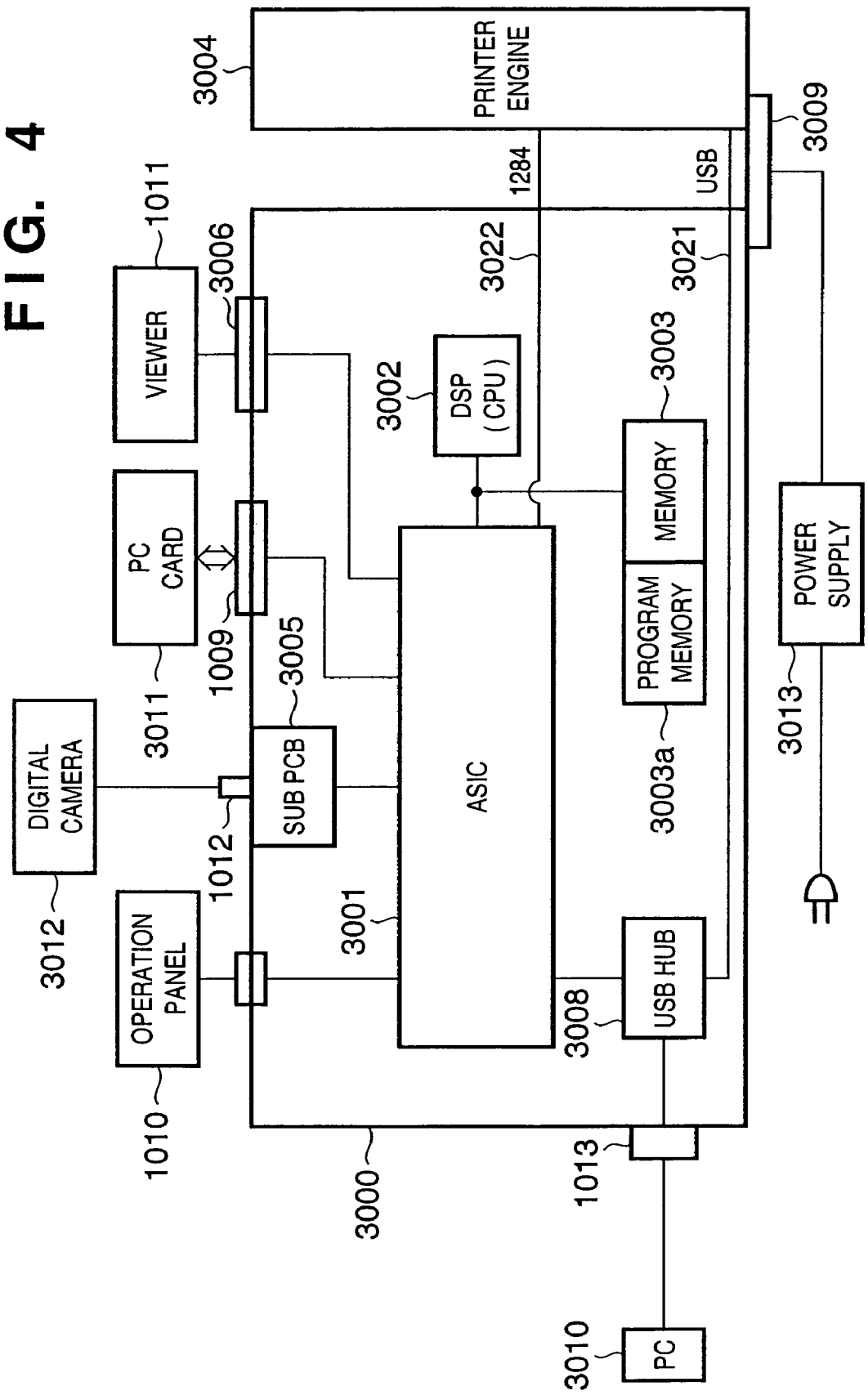
FIG. 4 is a block diagram showing the arrangement of the main part concerning control of the photo-direct printer apparatus according to the embodiment.

The arrangement of the main part concerning control of the photo-direct printer 1000 according to the embodiment will be explained with reference to FIG. 4. In FIG. 4, the same reference numerals as in the foregoing drawings denote the same parts, and a description thereof will be omitted.

In FIG. 4, reference numeral 3000 denotes a controller (control board); numeral 3001 denotes an ASIC (application specific LSI) whose arrangement will be described in detail below with reference to the block diagram of FIG. 5; numeral 3002 denotes a DSP (Digital Signal Processor) which incorporates a CPU and performs various control processes of the whole apparatus (to be described later), and image processes such as conversion from a luminance signal (RGB) to a density signal (CMYK), scaling, gamma conversion, and error diffusion; numeral 3003 denotes a memory having a program memory 3003a which stores the control program of the CPU of the DSP 3002, a RAM area which stores a program in running, and a memory area functioning as a work memory which stores image data and the like; numeral 3004 denotes a printer engine which is an ink-jet printer type printer engine for printing a color image using a plurality of color inks in this embodiment; numeral 3005 denotes a USB bus connector serving as a port for connecting a digital camera 3012; numeral 3006 denotes a connector for connecting the viewer 1011; and numeral 3008 denotes a USB bus hub which transmits data from a PC 3010 and outputs the data to the printer engine 3004 via a USB bus 3021 when the printer 1000 prints on the basis of image data from the PC 3010. The connected PC 3010 can directly exchange data and signals with the printer engine 3004 and execute printing (functions as a general PC printer). Reference numeral 3009 denotes a power connector which receives from a power supply 3013 a DC voltage converted from a commercial AC voltage. The PC 3010 is a general personal computer. Reference numeral 3011 denotes a memory card (PC card) described above; and 3012, the digital camera.

Signal exchange between the controller 3000 and the printer engine 3004 is performed via the USB bus 3021 or an IEEE 1284 bus 3022.

Figure 5:
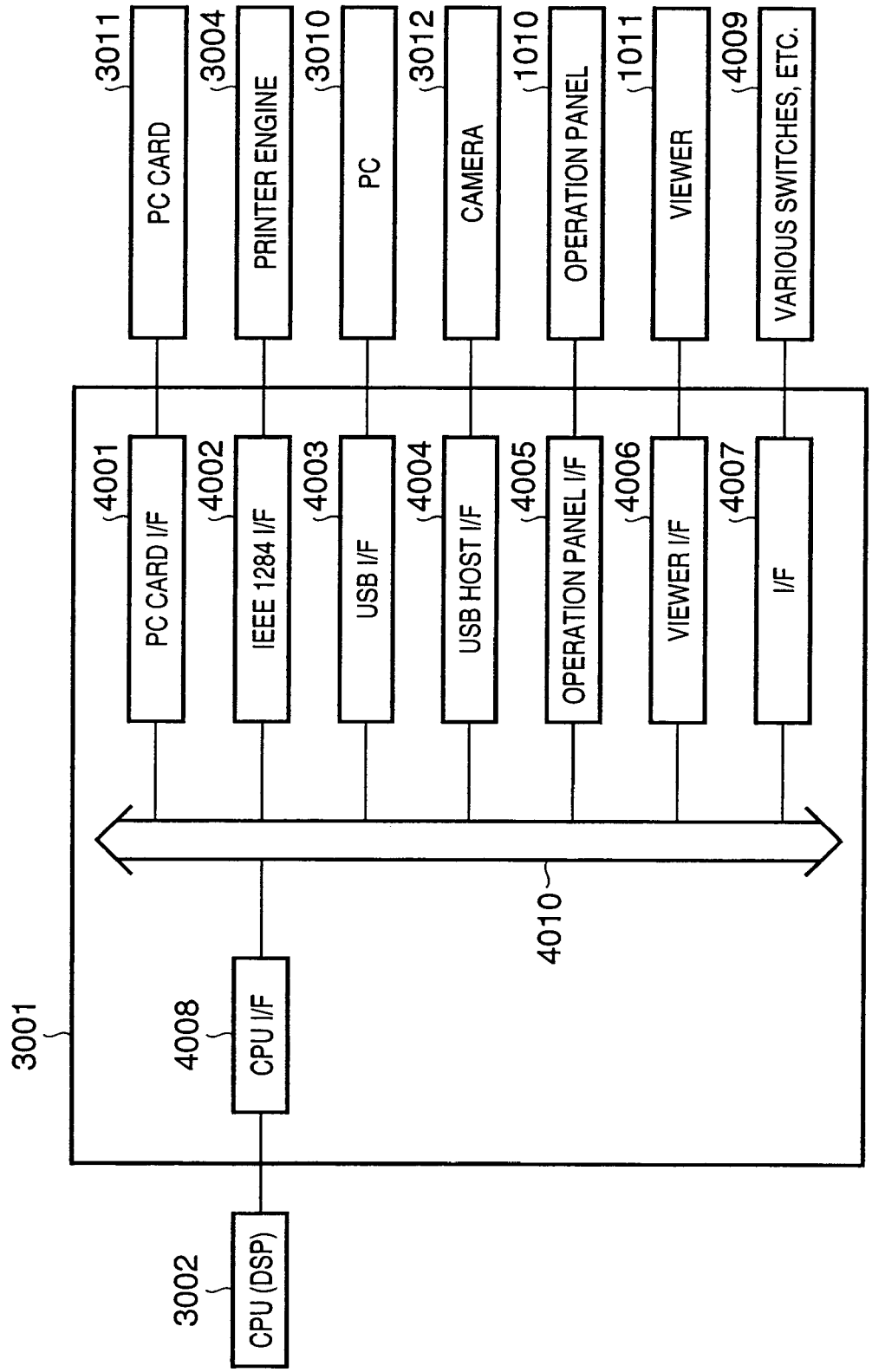
FIG. 5 is a block diagram showing the arrangement of the ASIC of the photo-direct printer apparatus according to the embodiment.

FIG. 5 is a block diagram showing the arrangement of the ASIC 3001. Also in FIG. 5, the same reference numerals as in the foregoing drawings denote the same parts, and a description thereof will be omitted.

Reference numeral 4001 denotes a PC card interface which reads image data stored in the mounted PC card 3011 or writes data in the PC card 3011; and numeral 4002 denotes an IEEE 1284 interface which exchanges data with the printer engine 3004. The IEEE 1284 interface 4002 is used to print image data stored in the digital camera 3012 or PC card 3011. Reference numeral 4003 denotes a USB interface which exchanges data with the PC 3010; numeral 4004 denotes a USB host interface which exchanges data with the digital camera 3012; numeral 4005 denotes an operation panel interface which receives various operation signals from the operation panel 1010 or outputs display data to the display 1006; numeral 4006 denotes a viewer interface which controls display of image data on the viewer 1011; numeral 4007 denotes an interface which controls an interface between various switches and LEDs 4009, and the like; numeral 4008 denotes a CPU interface which controls data exchange between these interfaces and the DSP 3002; and numeral 4010 denotes an internal bus (ASIC bus) which is connected to these units. The DSP 3002 executes image processes such as conversion from a luminance signal (RGB) to a density signal (CMYK), scaling, gamma conversion, and error diffusion, and control of the photo-direct printer 1000 in parallel to each other. Control of the printer 1000 includes processing of accessing the memory card 3011 and digital camera 3012 by controlling the PC card I/F 4001 and USB host I/F 4004.

Figure 6:
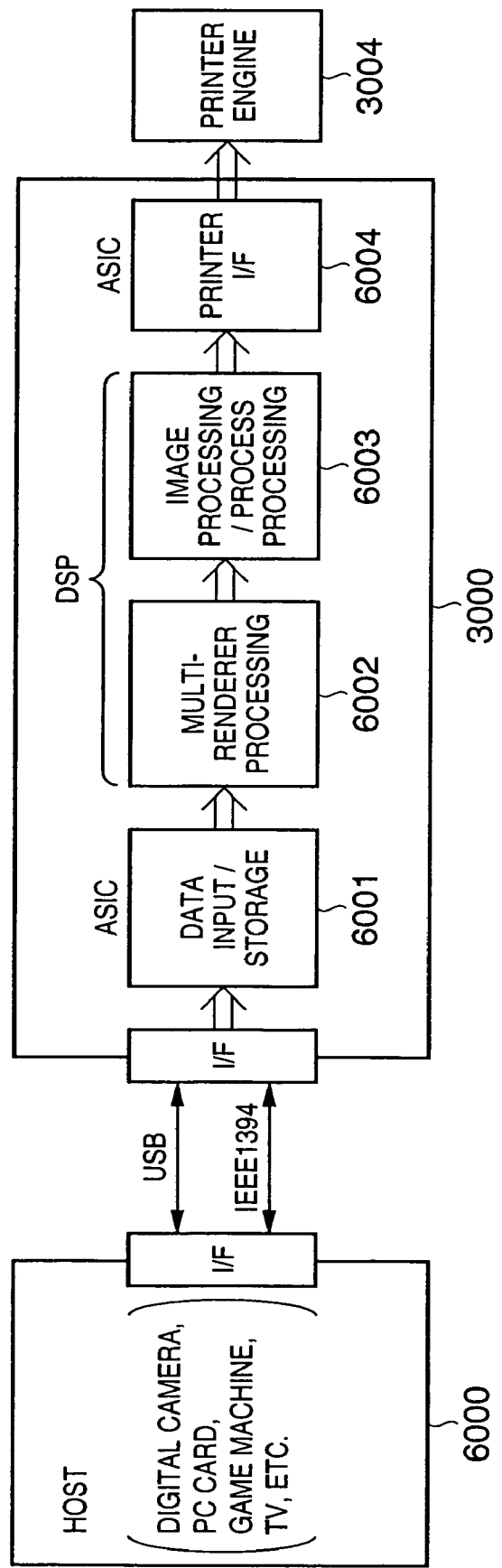
FIG. 6 is a functional block diagram showing a functional arrangement concerning the interface and image processing control of the photo-direct printer apparatus according to the embodiment.

FIG. 6 is a functional block diagram showing a functional arrangement concerning the interface and image processing control of the photo-direct printer 1000 according to the embodiment. Also in FIG. 6, the same reference numerals as in the foregoing drawings denote the same parts, and a description thereof will be omitted.

Reference numeral 6000 denotes a host (image data source) when viewed from the photo-direct printer 1000. The host 6000 includes the above-described PC 3010 serving as a host computer, the digital camera 3012, the PC card 3011, and a game machine, television device, and the like (none of them is shown). The host 6000 is connected via an interface such as a USB bus, IEEE 1284, or IEEE 1394. Another interface such as Bluetooth may be used.

The functions of the above-mentioned control board 3000 include data input/storage 6001 realized by the ASIC 3001, a printer interface 6004 via which print data is output to the printer engine 3004, multi-renderer processing 6002 executed by the DSP 3002, and image processing/process processing 6003.

Figure 7:
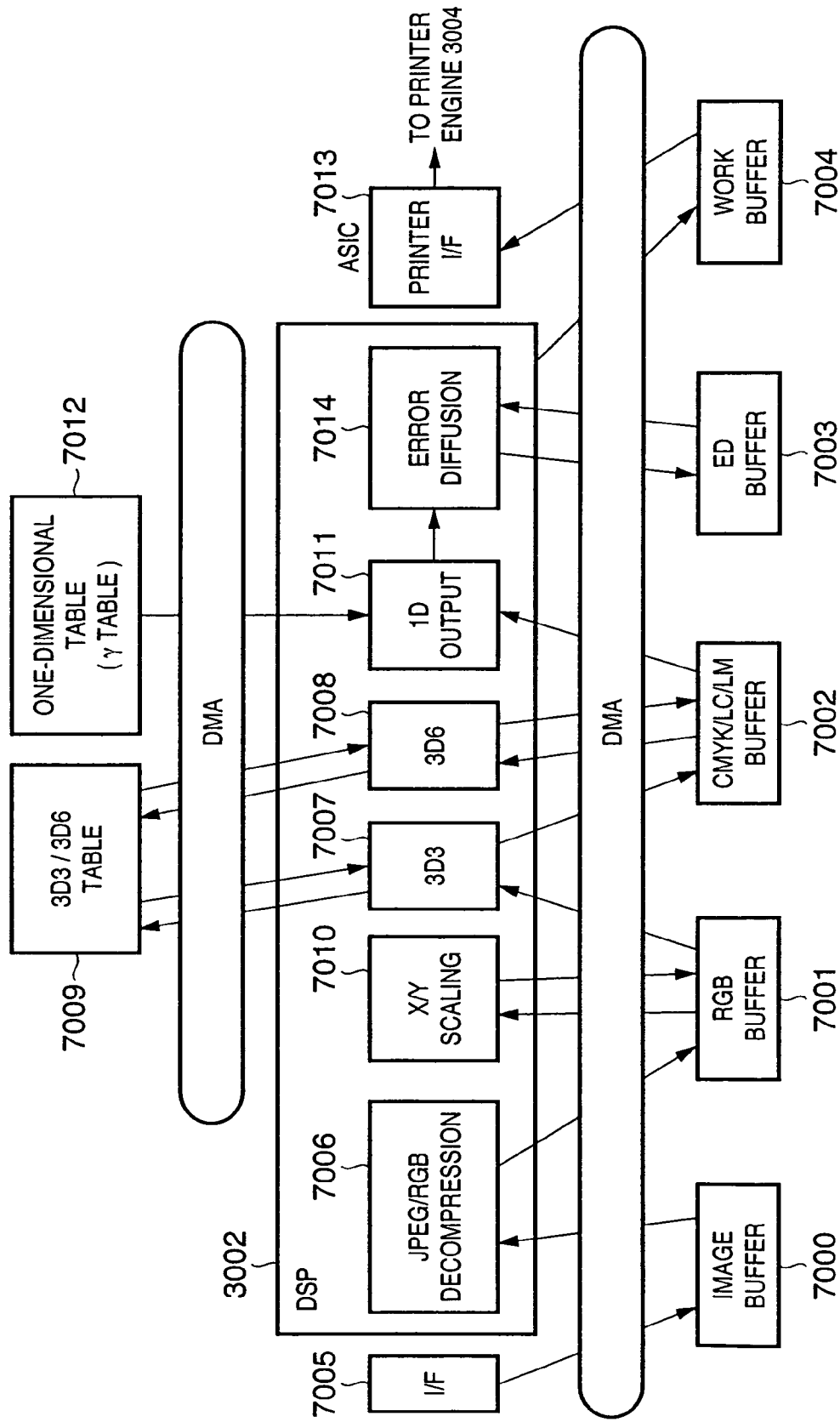
FIG. 7 is a functional block diagram showing in more detail the functional arrangement concerning image processing control of the photo-direct printer apparatus according to the embodiment.

FIG. 7 is a functional block diagram showing in more detail the functional arrangement concerning image processing control of the photo-direct printer 1000 according to the embodiment. Also in FIG. 7, the same reference numerals as in the foregoing drawings denote the same parts, and a description thereof will be omitted.

In FIG. 7, image data or JPEG-compressed image data input from the PC card 3011, camera 3012, or PC 3010 via an interface 7005 such as a USB bus interface is temporarily stored in an image buffer 7000. For compressed data, the data is decompressed by a JPEG decompressor 7006. Y, Cb, and Cr signals are converted into R, G, and B signals, which are stored in an RGB buffer 7001. Reference numeral 7010 denotes an X/Y scaling unit which changes the X and/or Y size of image data stored in the RGB buffer 7001. 3D3 (7007) converts the color space of R, G, and B data by looking up a loop-up table 7009. 3D6 (7008) converts R, G, and B signals into signals of six colors: C, M, Y, K, LC (Light Cyan), and LM (Light Magenta) by looking up the loop-up table 7009. Reference numeral 7011 denotes a 1D output unit which executes color processing such as γ conversion by looking up a one-dimensional table 7012. Reference numeral 7014 denotes an error diffusion (ED) unit which executes error diffusion processing to multilevel image data and generates binary image data (or multilevel data) of each color. The generated binary (or multilevel) image data is stored in an ED buffer 7003. Reference numeral 7004 denotes a work buffer which stores print data corresponding to a plurality of print heads for discharging respective color inks. The generated print data corresponding to the respective print heads are sent via a printer interface 7013 to the printer engine 3004 where the data are printed.

As described above, in the photo-direct printer 1000 according to the embodiment, the DSP 3002 executes control of each unit of the printer 1000 in addition to image processing. The DSP 3002 also has a parallel processing function, and can execute processes such as 3D3, 3D6, 1D output, and error diffusion described above in parallel to each other. The DSP 3002 is, e.g., a TMS 320 DSP available from Texas Instruments (TI). The DSP 3002 executes control to be described later in accordance with a control program stored in the program memory 3003a of FIG. 4.

The control program adopts a multitask form in which a task is assigned to each functional module. A representative of the task arrangement is shown in FIG. 8.

Figure 8:
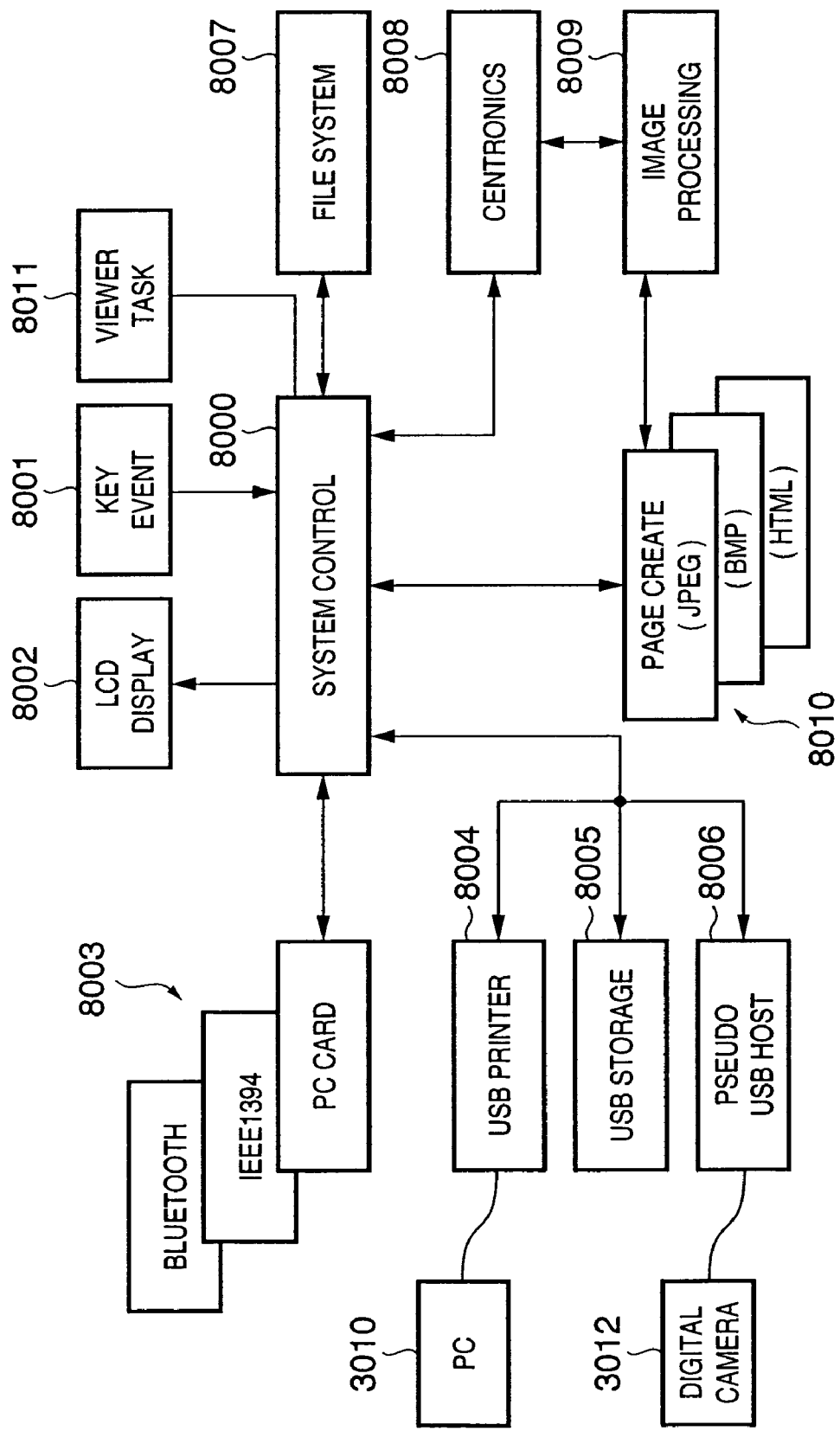
FIG. 8 is a block diagram for explaining a multitask arrangement in which a task is assigned to each functional module in the control program of the photo-direct printer apparatus according to the embodiment.

In FIG. 8, reference numeral 8000 denotes a system control task which performs arbitration of the overall system such as sequence control and exclusive processing accompanying the issue of an event and the end of an event between tasks; numeral 8001 denotes a key event task which executes analysis of a pressed key or the like on the basis of key operation on the operation panel 1010; numeral 8002 denotes a display task to the LCD display 1006 that is activated upon generation of UI control, a message display request, or the like on the display 1006, and executes display control of the display 1006; numeral 8003 denotes a task which is activated by read/write from/in the PC card 3011 or data input/output via IEEE 1394, Bluetooth, or the like; numeral 8004 denotes a USB printer task which is activated by data transfer from the PC 3010 connected via a USB bus, starts by a USB printer interrupt, and executes a PC printer function; numeral 8005 denotes a task which is activated by the system control task 8000 to initialize firmware, or activates/ends a USB control task or USB bulk task as a low-order task in accordance with a message fro the system control task 8000; numeral 8006 denotes a task which is activated by a USB task, and executes data read from the digital camera 3012 connected via a USB, various communication control operations, and the like; numeral 8007 denotes a file task which performs input/output control such as file open, close, read, or write; numeral 8008 denotes a task which is activated by a Centronics interface connected to the printer engine 3004, and executes print data DMA transmission, status response, and the like; numeral 8009 denotes an image processing task which receives RGB data, creates YMCK data by the above-described 3D processing, tetrahedron complement, color conversion, scaling, error diffusion processing, and the like, and creates raster image data to be finally output to the printer engine 3004; numeral 8010 denotes a page create task which decompresses JPEG data into image data, creates image data from BMP data, or creates image data from an HTML document, and in addition performs image processing such as photo-data correction or grayscale correction, RGB data creation, and the like; and numeral 8011 denotes a viewer task which executes display control to the viewer 1011 while the viewer 1011 is connected.

[First Embodiment]

The outline of processing by a DSP 3002 of a photo-direct printer 1000 according to the first embodiment will be explained with reference to FIGS. 9 to 18. Processing by the DSP 3002 is executed in the multitask form, but will be explained as the entire processing flow.

Figure 9:
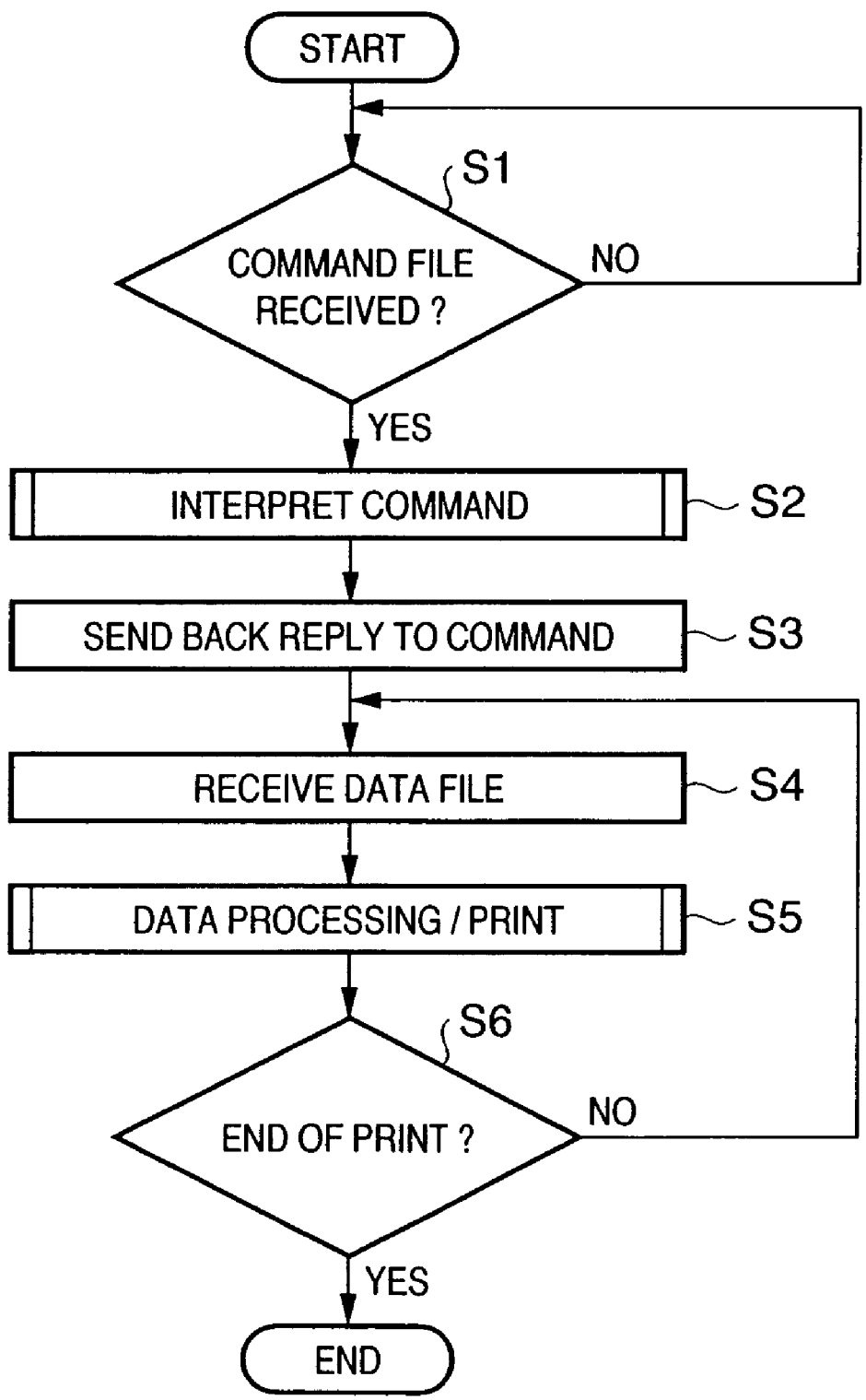
FIG. 9 is a flow chart showing the outline of reception/print processing of a command and image data by a DSP according to the first embodiment.

FIG. 9 is a flow chart showing the outline of reception/print processing of a command and image data by the DSP 3002 according to the first embodiment.

In step S1, it is determined whether a command file has been received from a PC 3010, a digital camera 3012, a game machine, a television device, or the like functioning as a host. The command file assumes to contain, as parameters, print conditions such as the number of prints, print paper size, and print quality. If YES in step S1, the process proceeds to step S2 and a command contained in the received command file is interpreted. The process proceeds to step S3, and sends back information about whether printing based on the command is possible, to the host which has transmitted the command on the basis of the interpretation of the command. The host which has been notified by the reply that printing is possible transmits image data to be printed to the photo-direct printer 1000.

The process proceeds to step S4, and data file transmitted by the host is received. Then the process proceeds to step S5, the data received from the host is decoded and is converted into print data suitable for a printer engine 3004. Then the print data is outputted to the printer engine 3004, and print operation is performed. The process proceeds to step S6, it is determined whether the entire data file from the host has been printed. If YES in step S6, the process returns to step S4 and repeats reception, decoding, and print processing of a data file.

Figure 10:
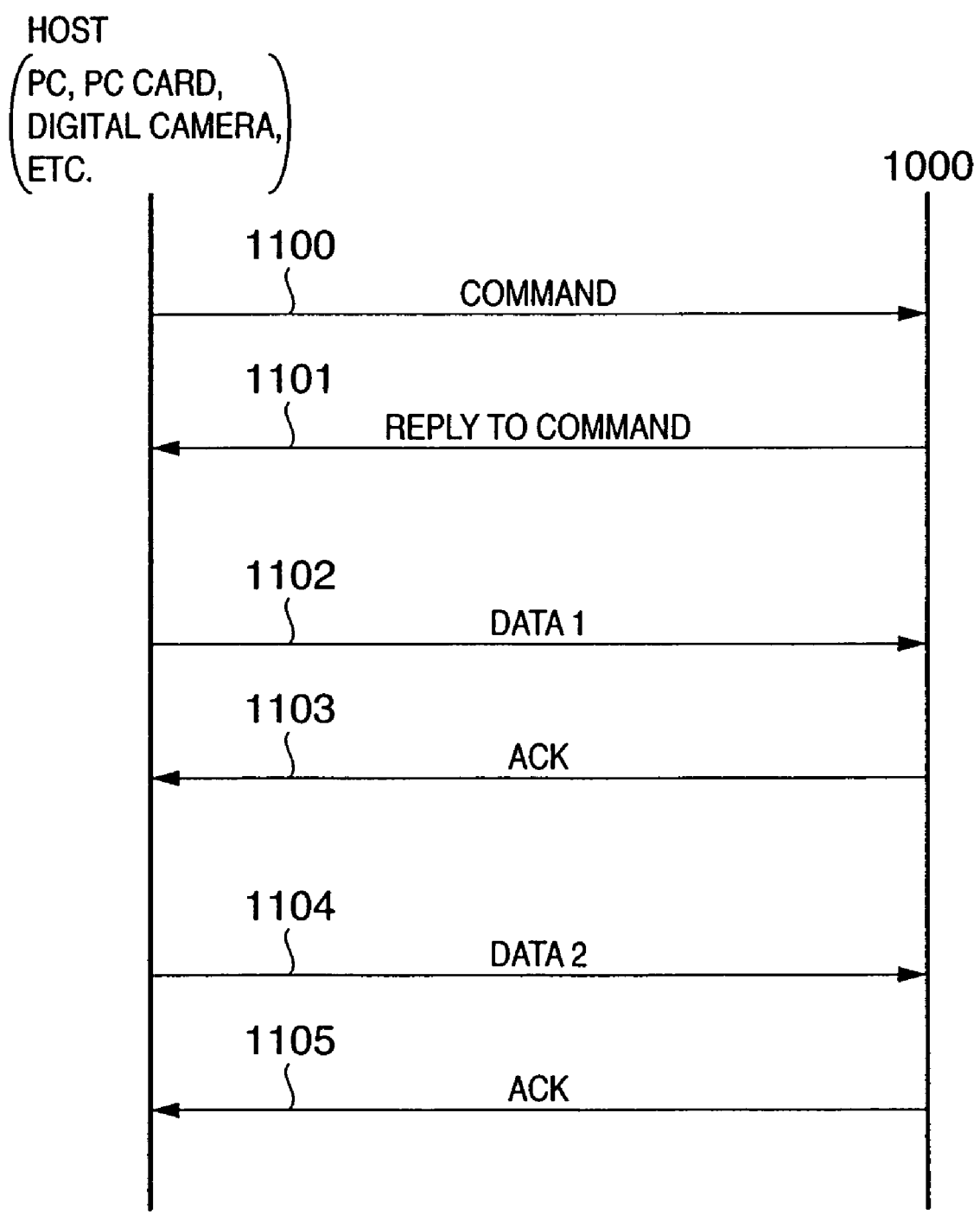
FIG. 10 is a chart showing communication procedures between a host and a photo-direct printer apparatus according to the first embodiment.

FIG. 10 depicts a chart showing communication procedures between the host and the photo-direct printer 1000. FIG. 10 shows the lapse of time downward.

In 1100, the host transmits a command to the printer 1000. The printer 1000 which has interpreted the command transmits a reply representing whether the command can be accepted (1101). If the host receives the reply to the command and determines that acceptance of the command is granted, the host transmits data 1 to the printer 1000 (1102). In this case, for example, JPEG image data of one A4-size page is transmitted. Upon reception of this image data, the printer 1000 notifies the host by ACK that the data has normally been received (1103). Upon reception of the ACK, the host transmits the next data (same data format) to the printer 1000 (1104). Upon reception of the image data, the printer 1000 notifies the host by ACK that the data has normally been received (1105). Data transfer in 1102, 1103, 1104, and 1105 is repeated until all image data to be printed are transmitted from the host.

As a result, the host transmits image data to the photo-direct printer 1000 according to the first embodiment, where printing is executed.

Figure 11:
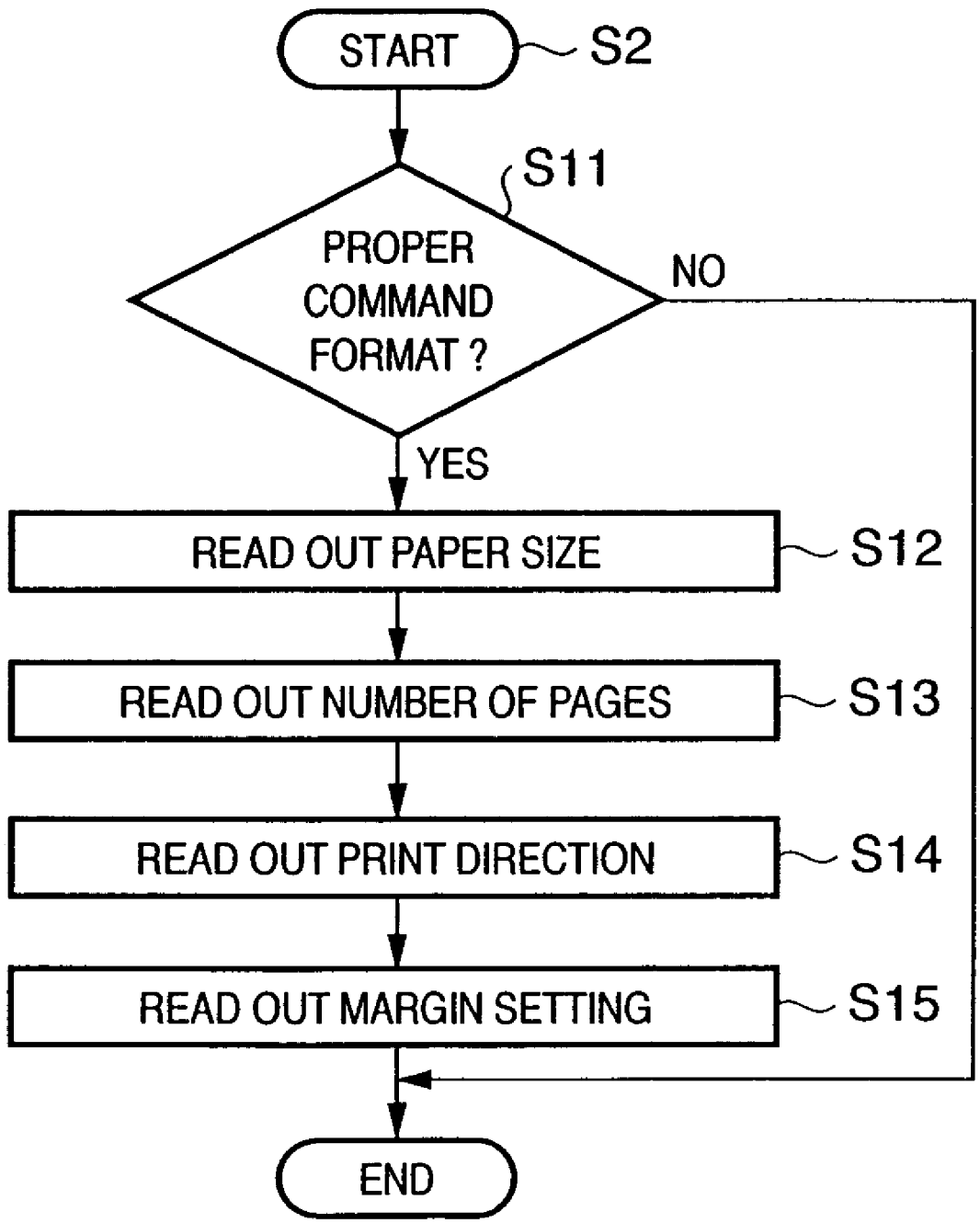
FIG. 11 is a flow chart showing command interpretation processing in step S2 of FIG. 9 according to the first embodiment.

FIG. 11 is a flow chart showing command interpretation processing in step S2 of FIG. 9.

In step S11, the type of command received from the host is checked and it is determined whether the command format of the received command file is processible by the photo-direct printer 1000, i.e., the command format is proper. If NO in step S11, the DSP 3002 ends the processing, and transmits to the host in step S3 (FIG. 9) a message that the command cannot be accepted. If YES in step S1, the process proceeds to step S12 and a paper size designated for printing from the command file is read out. Accordingly, the paper size used for printing is determined. The process proceeds to step S13, the number of print pages from the command file is read out, and then proceeds to step S14, print direction information is read out. That is, whether the print direction is the portrait or landscape direction of a paper sheet is determined. The process proceeds to step S15 and setting information about the margin on a paper sheet is read out. This setting information designates upper, lower, left, and right margin values on a paper sheet.

To print a plurality of images on one paper sheet, a layout parameter is read out as an optional parameter.

If the command file is normally interpreted, a message that the command has normally been accepted is transmitted to the host in step S3 (FIG. 9) from the printer 1000.

Figure 12:
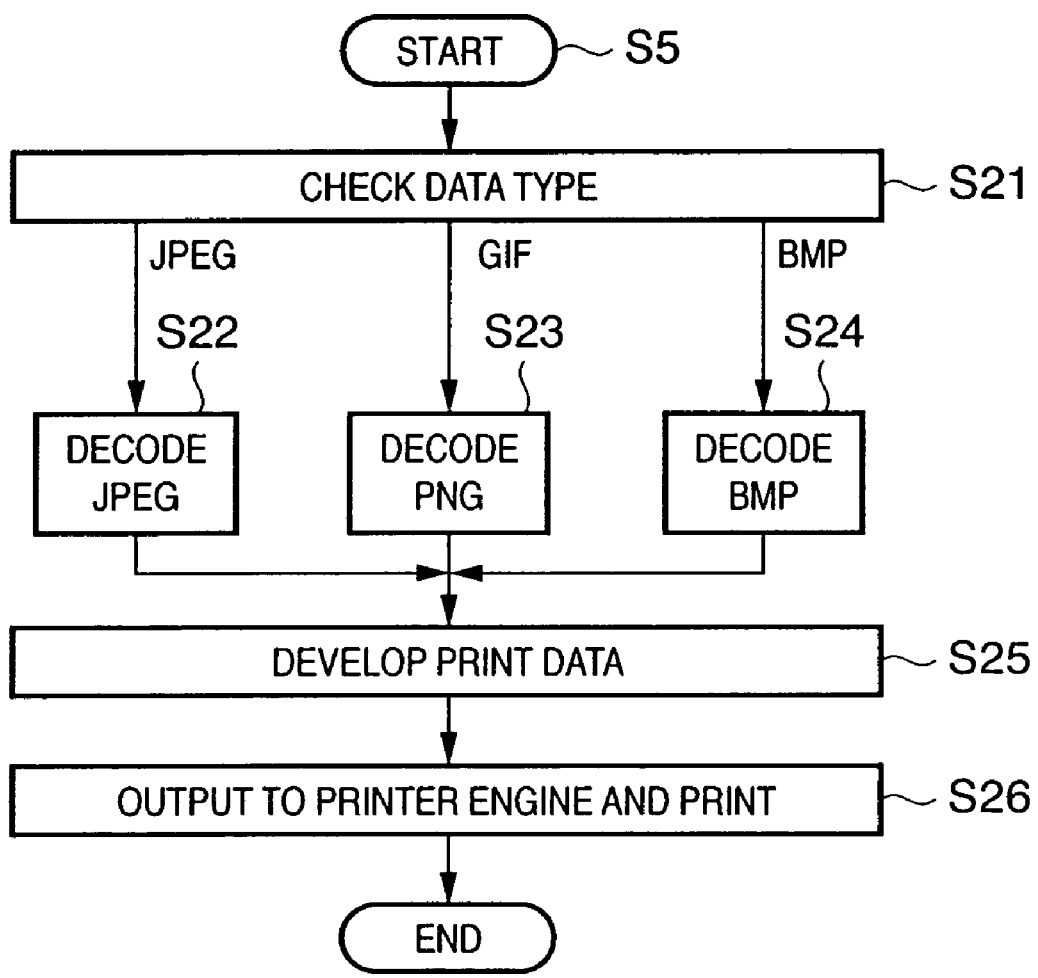
FIG. 12 is a flow chart showing data processing in step S5 of FIG. 9.

FIG. 12 depicts a flow chart showing data processing in step S5 of FIG. 9.

In step S21, the data type of data file is checked. The photo-direct printer 1000 according to the first embodiment can cope with three codes: JPEG code, PNG code, and BMP code. The data type can be easily checked by checking, e.g., a file extension, and can also be confirmed by checking tag information in a file for a JPEG code.

If it is determined in step S21 that the data type is a JPEG code, the process proceeds to step S22 and the JPEG code is decoded. For a PNG code, the process proceeds to step S23 and the PNG code is decoded. For a BMP code, the process proceeds to step S24 and the BMP code is decoded. Then the process proceeds to step S25, image data decoded in any one of steps S22, S23, and S24 is developed into print data suitable for printing in the printer engine 3004. The process proceeds to step S26, the developed print data is sent to the printer engine 3004 via an IEEE 1284 interface, and printing operation is performed. The code data format being processed in the photo-direct printer 1000 according to the first embodiment is not limited to the above described data formats, and other code formats such as HTML format, pdf format, gif format, and pic format can also be adopted.

As described above, according to the first embodiment, a command file or data file can be transmitted from a host serving as a data transmission source to the photo-direct printer 1000 and can be printed without transmitting any complicated command corresponding to the data file format.

[Second Embodiment]

Figure 13:
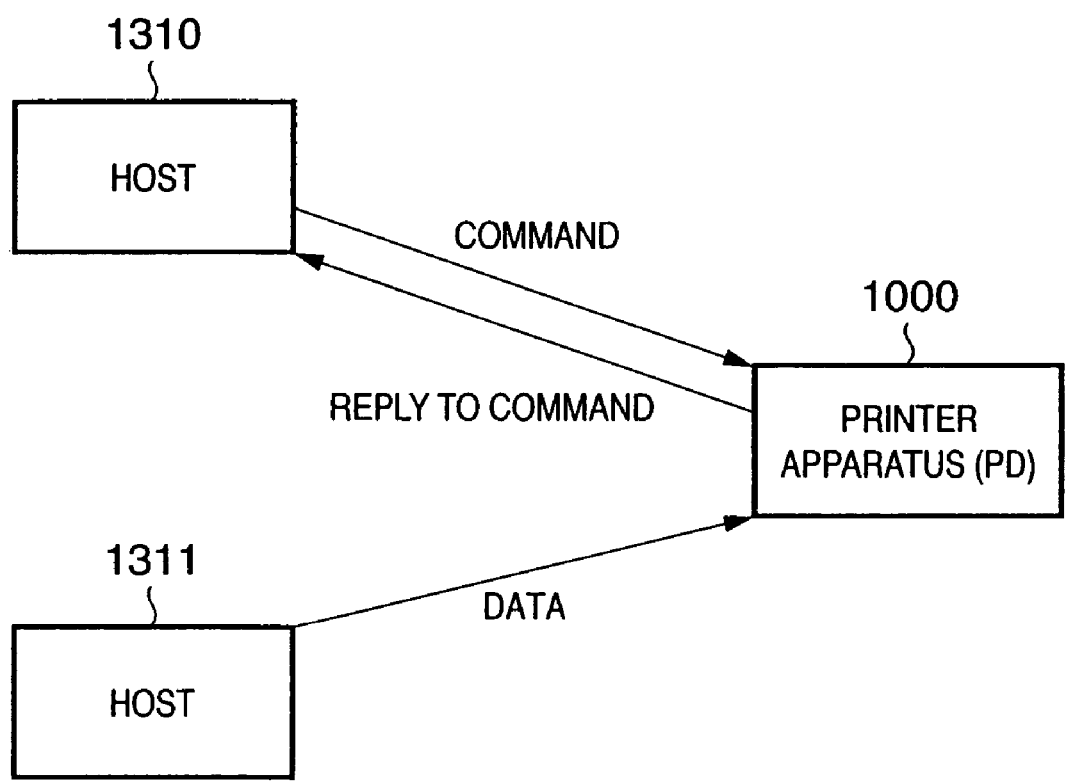
FIG. 13 is a block diagram for explaining the second embodiment of the present invention in which a host which transmits a command file to the photo-direct printer apparatus and a host which transmits a data file are different apparatuses.

FIG. 13 is a block diagram showing a case where a host which transmits a command file to a photo-direct printer 1000 and a host which transmits a data file are different from each other.

In this example, a host 1310 transmits a command to the photo-direct printer 1000, and receives a reply to the command from the printer 1000. If the command can be accepted by the printer 1000, a host 1311 transmits image data to the photo-direct printer 1000, and designates printing corresponding to the command.

Figure 14:
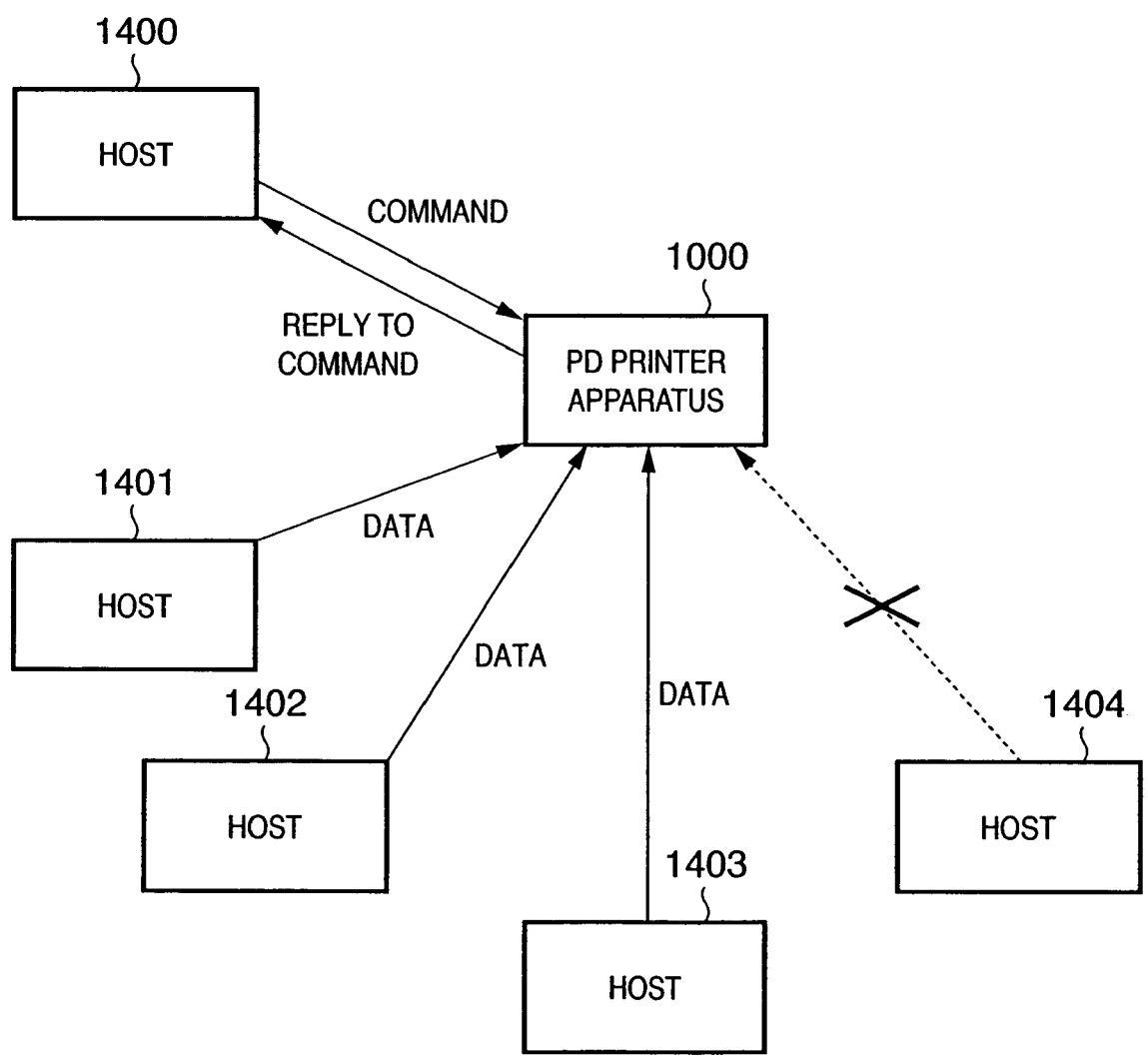
FIG. 14 is a block diagram for explaining the connection form between a photo-direct printer apparatus and a plurality of hosts according to the second embodiment.

Alternatively, as shown in FIG. 14, a plurality of hosts may transmit image data to the photo-direct printer 1000. In this case, information about a transmission source (e.g., host ID information and the number of transmission devices) is transmitted in advance as a command parameter to the photo-direct printer 1000. This allows the photo-direct printer 1000 to receive and print image data from only designated hosts without receiving and processing image data from a host not registered in the parameter. These hosts may be different apparatuses such as a personal computer, digital camera, digital video camera, and game machine.

For example, reception of data from three hosts: a host 1401 (ID=2), a host 1402 (ID=3), and a host 1403 (ID=4) are designated by a command from a host 1400. In this case, the number of hosts as transmission sources is "3", and host IDs "2", "3", and "4" are transmitted as parameters from the host 1400 to the photo-direct printer 1000. The photo-direct printer 1000 determines whether to receive image data, by referring to a host ID sent together with the image data from each host. Even if image data from a host 1404. (ID=5) is received, the image data is not received or printed by the photo-direct printer 1000 because the host ID is not registered in the photo-direct printer 1000 in advance by a command from the host 1400. When image data from a host whose ID is registered in advance is received, the photo-direct printer 1000 sends back a print enable response to the host.

In this case, the photo-direct printer 1000 is in an image data reception only mode for the hosts 1401 to 1403 designated by the command from the host 1400, and cannot receive and print any image data from another host. After processing of receiving and printing data from the designated hosts has been completed, the photo-direct printer 1000 ends the reception mode for data from only the designated hosts, and returns to an original mode in which the printer 1000 can receive and print image data from another host.

After processing of receiving and printing image data from the designated hosts, the photo-direct printer 1000 may notify the host 1400 serving as the command transmission source of the end of the reception only mode for the designated hosts.

Figure 15:
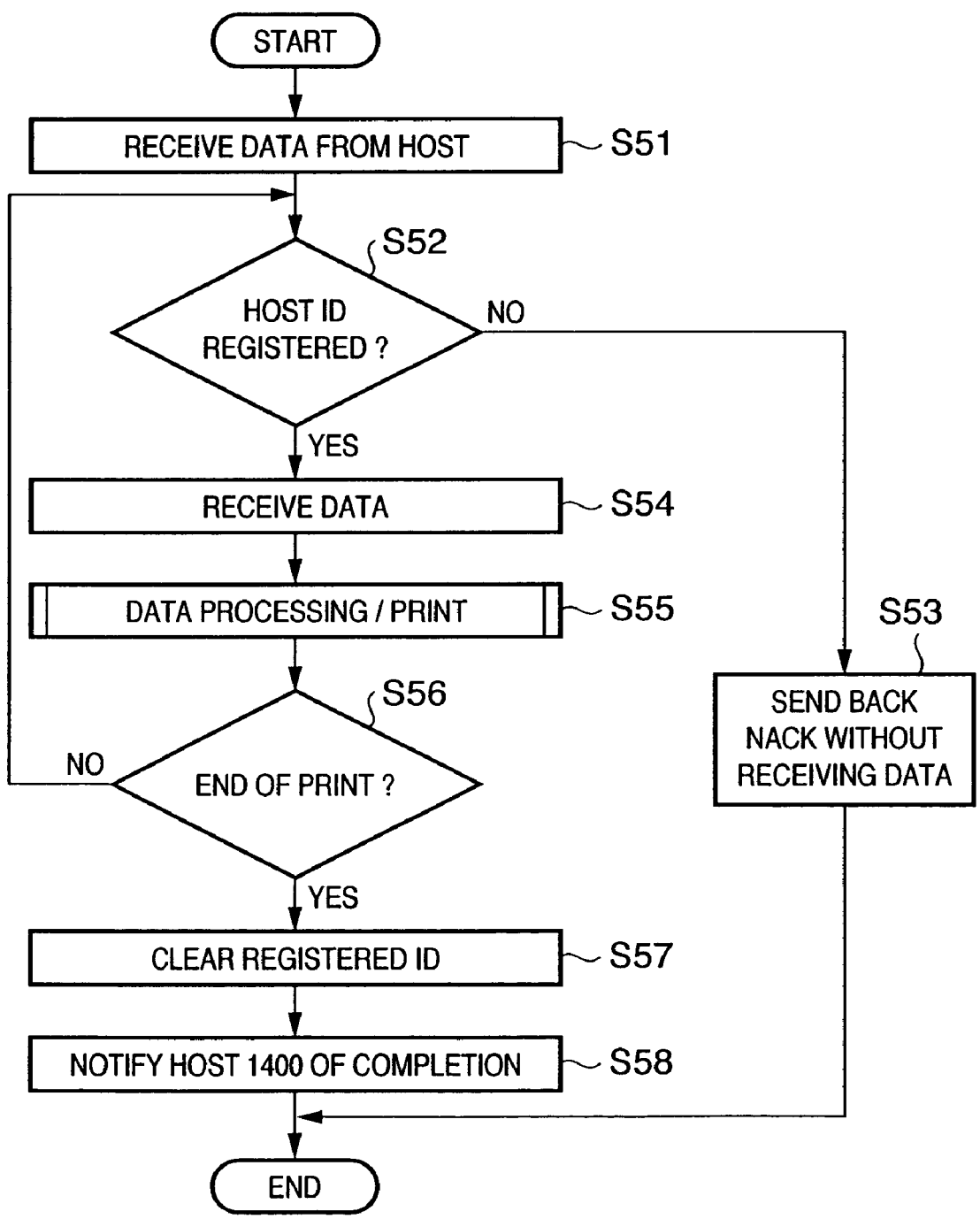
FIG. 15 is a flow chart showing reception/print processing of image data from a host by the photo-direct printer apparatus according to the second embodiment.

FIG. 15 is a flow chart showing reception/print processing of image data from a host by the photo-direct printer 1000 according to the second embodiment.

If the photo-direct printer 1000 receives image data from a host in step S51, the process proceeds to step S52 and it is checked whether the ID of the host which has transmitted the image data has been in advance registered in the printer 1000. If NO in step S52, the process proceeds to step S53 and a negative acknowledgement (NACK) is sent back to the host without receiving the image data.

If the ID of the host has been registered in advance in step S52, the process proceeds to step S54 and the image data is received and an ACK signal is sent back to the host. In step S55, similar to step S5 in FIG. 9, the photo-direct printer 1000 executes processing of the received data and print processing. Then, the process proceeds to step S56 and it is checked whether print processing by reception of the image data from the host has ended. If NO in step S56, the process proceeds to step S52 and the above-described processing is repeated.

If print processing base on the image data received from the host has ended in step S56, the process proceeds to step S57, the ID registered in advance by the command from the host 1400 is erased, and receiving and printing data from another unregistered host are enabled. The process advances to step S58, and the host 1400 which has transmitted the command for registering a host ID is notified of the end of reception of image data from the host and the end of print processing.

The process may advance from step S56 to step S57 after an elapse of a predetermined time period after the end of print processing based on image data received from one host. Alternatively, the printer apparatus 100 may hold the registered host ID which was registered based on a command from a host 1400, as long as the host is connected to the photo-direct printer 1000.

As described above, according to the second embodiment, reception of a command and reception/printing processing of image data can be achieved even if an image data transmission source and command transmission source are different from each other. Further, image data from a plurality of data transmission sources (hosts) can be received and printed.

[Third Embodiment]

Figure 16:
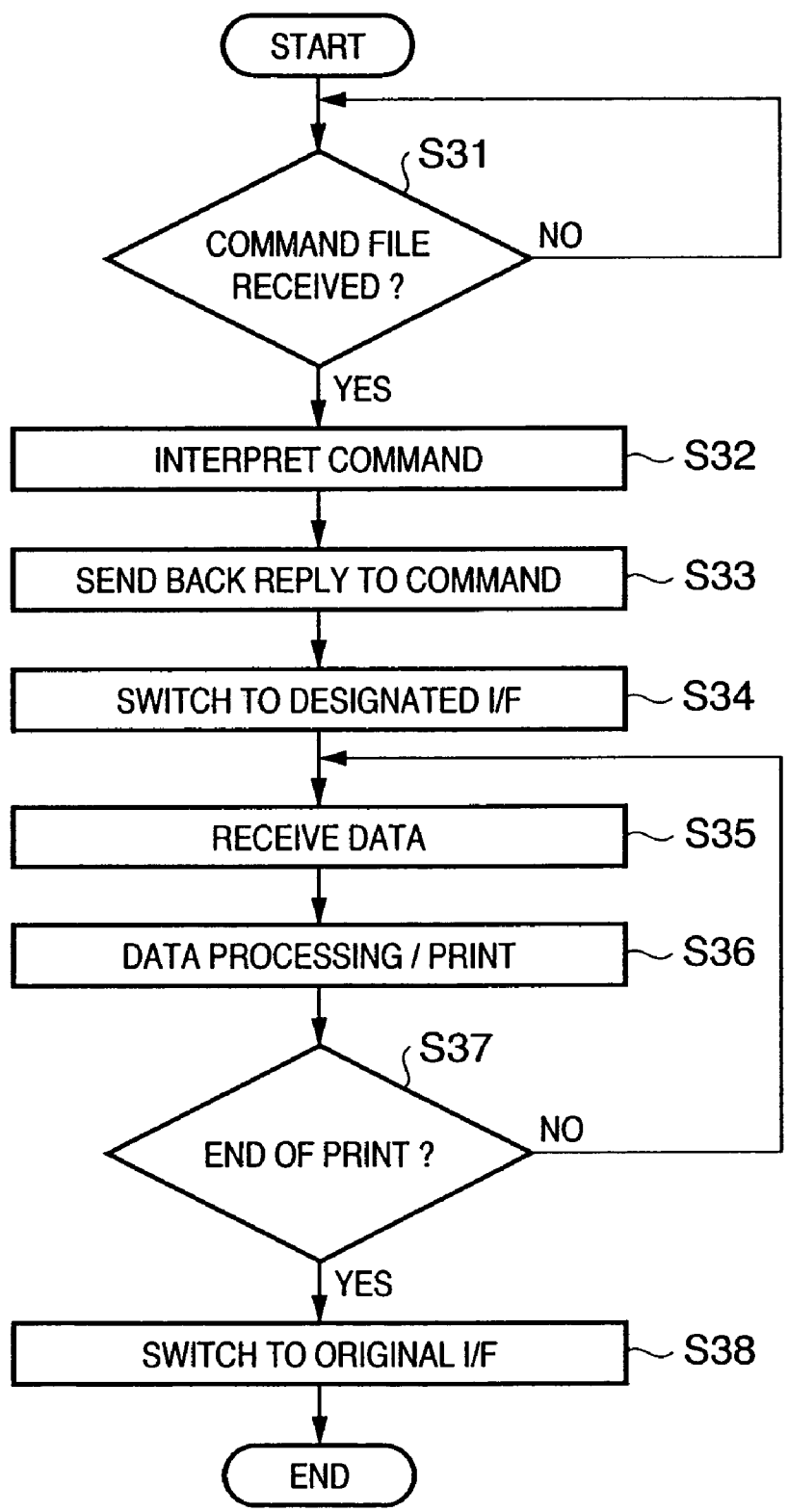
FIG. 16 is a flow chart showing control processing in a photo-direct printer apparatus according to the third embodiment of the present invention which receives a command from a host, receives data via different I/Fs, and prints.

FIG. 16 is a flow chart showing control processing in a photo-direct printer 1000 according to the third embodiment which receives a command from a host, receives image data via different I/Fs, and prints the image data.

Figure 17:
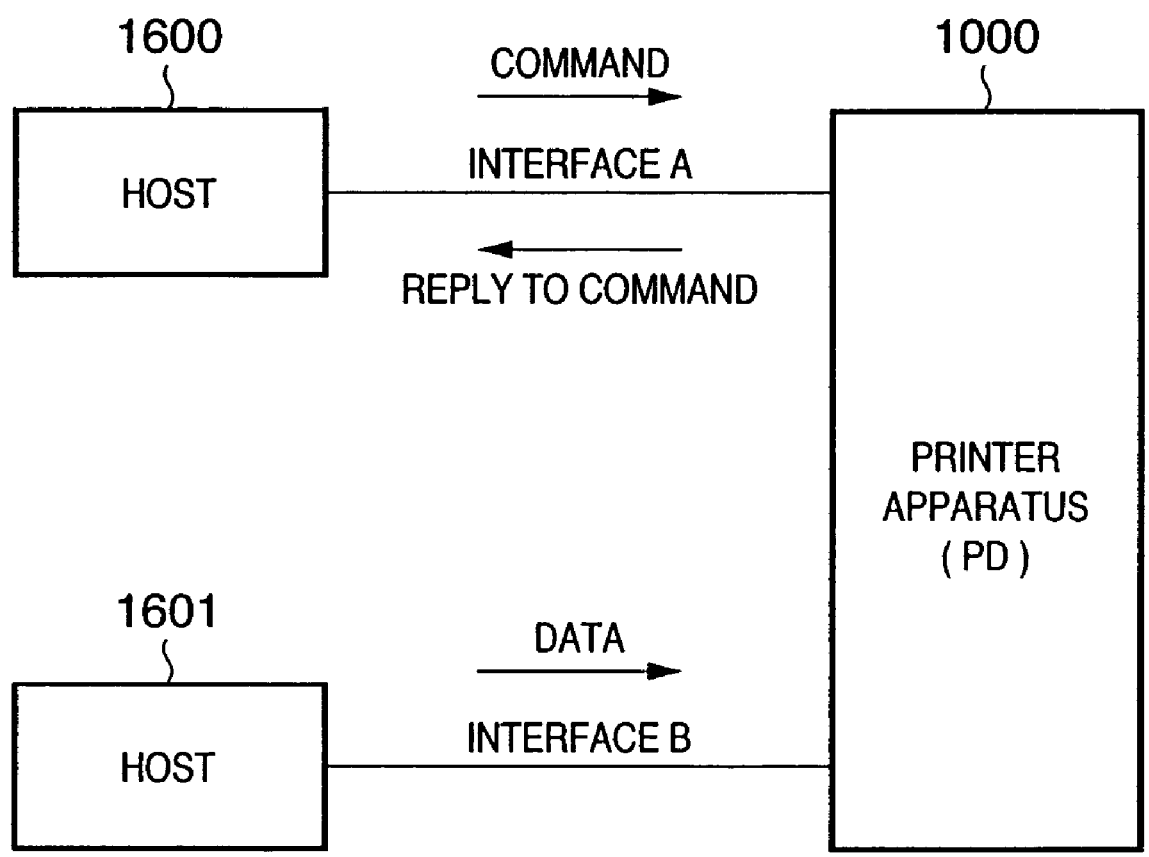
FIG. 17 is a block diagram showing a state in which first and second hosts are connected to the photo-direct printer apparatus via different I/Fs according to the third embodiment of the present invention.

FIG. 17 is a block diagram showing a state in which first and second hosts 1600 and 1601 are connected to the photo-direct printer 1000 via different I/Fs. In FIG. 17, the host 1600 and photo-direct printer 1000 are connected via interface A. The photo-direct printer 1000 receives a command from the host 1600, determines whether the command is acceptable, and sends back a reply to the command in accordance with the determination result. The photo-direct printer 1000 is also connected to the host 1601 via interface B. The photo-direct printer 1000 receives image data from the host 1601, processes the image data received from the host 1601 in accordance with a command from the host 1600, and executes printing.

In FIG. 16, it is checked in step S31 whether a command file is received from the host 1600. As described above, the command file contains, as parameters, print conditions such as the number of printed images and print size. If YES in step S31, the process advances to step S32 and a command contained in the received command file is interpreted. The process proceeds to step S33, and if the command is proper, an acknowledgement (ACK) is sent back to the host 1600. This reply contains a parameter concerning the switchable I/F of the photo-direct printer 1000. If the command cannot be executed by the printer 1000, a negative acknowledgement is sent back to the host 1600.

After that, the process advances to step S34 and the I/F is switched to one designated by the command from the host 1600, e.g., interface B in the example of FIG. 17. At this time, the ID of the original interface A is stored in a memory 3003 of the printer 1000. The process advances to step S35 and image data is received from the host 1601 via the switched interface B. In step S36, similar to step S5 of FIG. 9 described above, processing of the received image data and print processing are executed. In image data processing, the image data is decoded and converted into print data suitable for the printer engine 3004 of the photo-direct printer 1000, thus performing print operation. If image data is received via another interface, the image data is not printed while image data is being received and printed in steps S35 and S36. Thereafter, the process proceeds to step S37 and it is checked whether print processing based on the image data from the host 1601 has been completed. If NO in step S37, the process returns to step S35 and the above-described processing is executed. After printing ends, the process advances to step S38, the I/F is switched to the interface A by referring to the ID of the original I/F (interface A) stored in step S34, and it shifts to the standby state.

As described above, according to the third embodiment, reception of a command and print processing based on the command can be executed even when a command transmission source and image data transmission source are different from each other.

[Fourth Embodiment]

Figure 18:
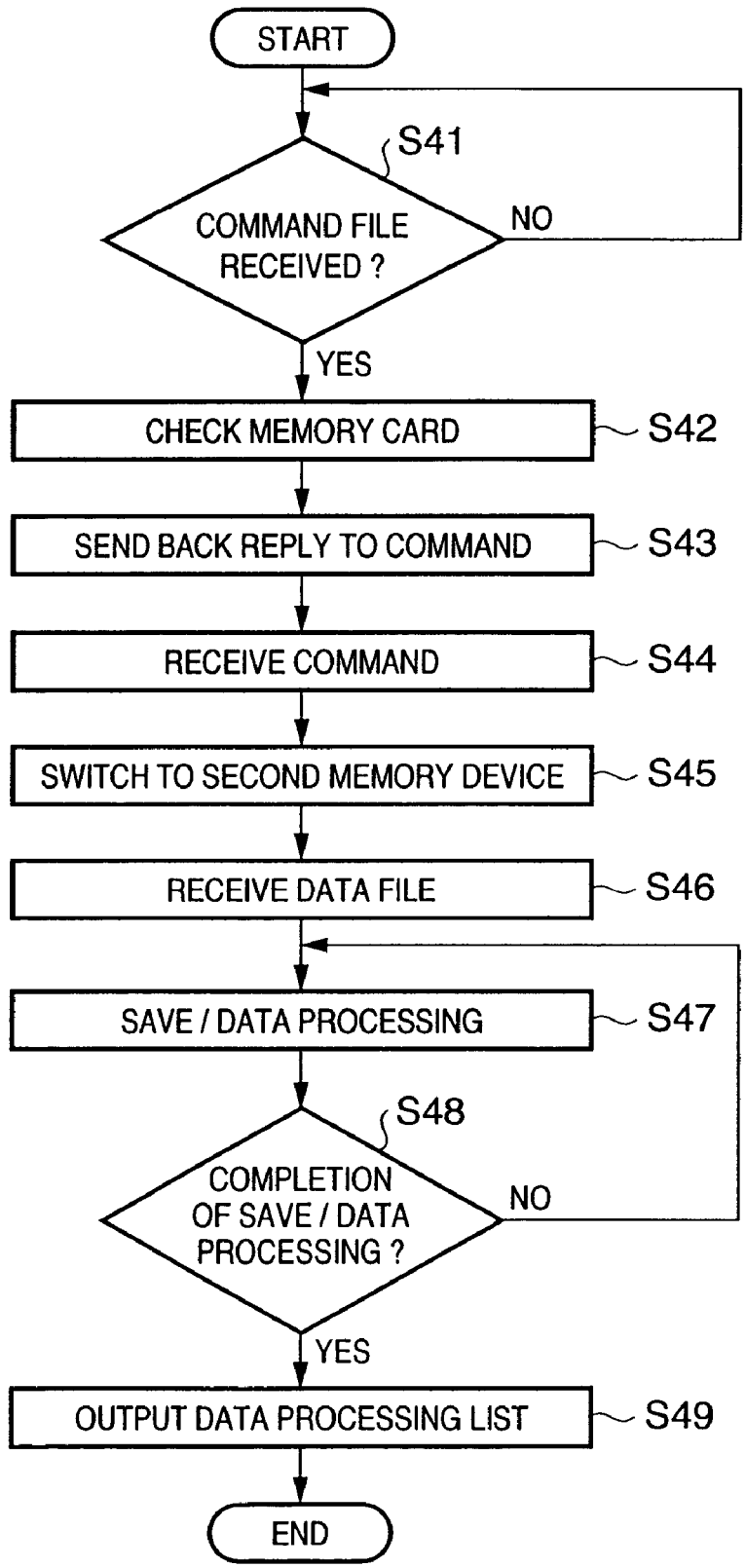
FIG. 18 is a flow chart showing control processing of receiving image data from a host and outputting a data processing result in a photo-direct printer apparatus according to the fourth embodiment of the present invention.

FIG. 18 is a flow chart showing control processing of receiving image data from a host and outputting a data processing result in the photo-direct printer 1000 according to the fourth embodiment of the present invention. The fourth embodiment will exemplify the photo-direct printer 1000 having a plurality of memory means. For example, the photo-direct printer 1000 has two PC card I/F means, can store image data in two PC cards, and can read out image data from the two PC cards to print the data.

In step S41, it is checked whether a command file is received from a host. The command contains parameters such as the contents of image data, image size, and image format. If a proper command file is received, an acknowledgement (ACK) is sent back to the host, then the process advances to step S42, and a PC card 3011 is checked. If the command file is not proper in step S41, the printer 1000 sends back a negative acknowledgement (NACK) to the host, similar to the above-described embodiments, and ends the processing.

The process proceeds to step S43 from step S42, the check result of the PC card 3011 is sent back to the host. When image data cannot be saved in the designated PC card 3011 because the PC card 3011 designated by the host is not mounted in the photo-direct printer 1000 or the remaining memory capacity of the PC card 3011 is too small to store the image data, the printer 1000 notifies the host of a message of this result and the necessity of another PC card.

If the host determines to save the image data in another PC card, the host transmits a new command, and the printer 1000 receives the command in step S44. The process advances to step S45 and the I/F is switched to a second PC card newly designated from the host. The process advances to step S46, the image data is received from the host, and the image data is saved in the second PC card in step S47 (may process the image data at the same time). The process advances to step S48, it is checked whether save and/or data processing has completely ended. If YES in step S48, the process proceeds to step S49 and a data processing list is outputted.

The fourth embodiment has exemplified the printer apparatus having a plurality of PC cards. In addition, the printer apparatus may have a plurality of interfaces such as a memory stick interface and SD card interface.

As described above, according to the fourth embodiment, received data can be saved in another substitute memory.

The present invention may be applied to a system constituted by a plurality of devices (e.g., a host computer, interface device, reader, and printer) or an apparatus (e.g., a copying machine or facsimile apparatus) formed from a single device.

The object of the present invention is also achieved when a storage medium (or recording medium) which stores software program codes for realizing the functions of the above-described embodiments is supplied to a system or apparatus, and the computer (or the CPU or MPU) of the system or apparatus reads out and executes the program codes stored in the storage medium. In this case, the program codes read out from the storage medium realize the functions of the above-described embodiments, and the storage medium which stores the program codes constitutes the present invention. The functions of the above-described embodiments are realized when the computer executes the readout program codes. Also, the functions of the above-described embodiments are realized when an operating system (OS) running on the computer performs part or all of actual processing on the basis of the instructions of the program codes.

The functions of the above-described embodiments are also realized when the program codes read out from the storage medium are written in the memory of a function expansion card inserted into the computer or the memory of a function expansion unit connected to the computer, and the CPU of the function expansion card or function expansion unit performs part or all of actual processing on the basis of the instructions of the program codes.

As has been described above, according to the embodiments, a printer apparatus which is connected to a PC, memory card, and digital camera, receives image data from them, and prints the image data can easily select a host serving as an image data source. Also, the printer apparatus can receive image data from various hosts and print the received image data.

The embodiments have exemplified a digital camera as an image sensing apparatus, but the present invention is not limited to this. For example, cell phones with an image sensing function and a function of saving sensed image data have recently been known. Instead of the digital camera described in the embodiments, such a cell phone can be connected via a connection cable.

As a portable information terminal, PDAs (Personal Digital Assistances) having a liquid crystal monitor capable of displaying an image and a memory capable of saving a sensed image have recently been spread. Such a PDA can be connected via a connection cable to print saved image data, similar to the digital camera in the embodiments.

The photo-direct printer apparatus according to the embodiments can implement the functions of a PC printer, camera printer, and memory printer by single printer apparatus.

The present invention is not limited to the above embodiments and various changes and modifications can be made within the spirit and scope of the present invention. Therefore, to apprise the public of the scope of the present invention, the following claims are made.

The invention claimed is:

1. A printing apparatus for printing an image on the basis of image data from a plurality of image sources, comprising:

a first reception unit configured to receive a control command from a first image data source of the plurality of image data sources, wherein the control command designates one or more second image data sources other than the first image data source that are permitted to supply image data to the printing apparatus out of the plurality of image data sources;

a second reception unit configured to interpret the control command received by said first reception unit and to receive image data from the one or more second image data sources designated by the control command;

a generation unit configured to generate print data based on the image data received by said second reception unit; and a print unit configured to print an image on a printing medium based on the print data generated by said generation unit.

2. The printing apparatus according to claim 1, further comprising an inhibition unit configured to inhibit reception of the image data from an image data source other than the second image data sources designated by the control command.

3. A printing apparatus for printing an image on the basis of image data from a plurality of image data sources, comprising:

a plurality of interfaces, each configured to connect with each of the plurality of image data sources;

a first reception unit configured to receive a control command from a first image data source of the plurality of image data sources, wherein the control command designates switching a first interface for connecting with the first image data source to a second interface for connecting with a second image data source;

a switching unit configured to interpret the control command received by said first reception unit and to switch from the first interface to the second interface;

a second reception unit configured to receive image data from the second image data sources via the second interface after said switching unit has switched to the second interface;

a generation unit configured to generate print data based on the image data received by said second reception unit; and a print unit configured to print an image on a printing medium based on the print data generated by said generation unit.

4. The printing apparatus according to claim 3, wherein the plurality of image data sources include at least a digital image sensing apparatus for outputting a sensed image signal by a digital signal, a memory card for storing image data, and a computer device.

5. A control method of controlling a printing apparatus for printing an image on the basis of image data from a plurality of image data sources, the method comprising:

a first reception step of receiving a control command from a first image data source of the plurality of image data sources, wherein the control command designates one or more second image data sources other than the first image data source, that are permitted to supply image data to the printing apparatus out of the plurality of image data sources;

a second reception step of interpreting the control command received in said first reception step and receiving image data from the second image data sources designated by the control command;

a generation step of generating print data based on the image data received in said second reception step; and a print step of printing an image on a printing medium based on the print data generated in said generation step.

6. The control method according to claim 5, further comprising the inhibition step of inhibiting reception of the image data from an image data source other than the second image data sources designated by the control command.

7. The printing apparatus control method according to claim 5, wherein the plurality of image data sources include at least a digital image sensing apparatus for outputting a sensed image signal by a digital signal, a memory card for storing image data, and a computer device.

8. A program which executes the control method defined in claim 5.

9. A control method of controlling a printing apparatus for printing an image on the basis of image data from a plurality of image data sources, the method comprising:

a first reception step of receiving a control command from a first image data source of the plurality of image data sources, wherein the control command designates switching a first interface for connecting with a second image data source;

a switching step of interpreting the control command received in said first reception step and switching from the first interface to the second interface;

a second reception step of receiving image data from the second image data sources via the second interface after the first interface is switched to the second interface in said switching step;

a generation step of generating print data based on the image data received in said second reception step; and a print unit configured to print an image on a printing medium based on the print data generated in said generation step.

10. A computer-executable control program stored on a computer-readable storage medium which executes the control method defined in claim 9.

* * * * *